(12) United States Patent
Mu et al.

(10) Patent No.: US 9,734,436 B2
(45) Date of Patent: Aug. 15, 2017

(54) HASH CODES FOR IMAGES

(71) Applicant: AT&T INTELLECTUAL PROPERTY I, L.P., Atlanta, GA (US)

(72) Inventors: Yadong Mu, Middletown, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 54 days.

(21) Appl. No.: 14/732,463

(22) Filed: Jun. 5, 2015

(65) Prior Publication Data
US 2016/0358043 A1    Dec. 8, 2016

(51) Int. Cl.
| G06K 9/62 | (2006.01) |
| G06K 9/66 | (2006.01) |
| G06F 17/30 | (2006.01) |
| G06N 3/04 | (2006.01) |

(52) U.S. Cl.
CPC ........... *G06K 9/66* (2013.01); *G06F 17/3028* (2013.01); *G06F 17/30256* (2013.01); *G06F 17/30598* (2013.01); *G06K 9/6217* (2013.01); *G06N 3/04* (2013.01)

(58) Field of Classification Search
CPC .................................................. G06K 9/6217
See application file for complete search history.

(56) References Cited

U.S. PATENT DOCUMENTS

| 6,823,075 | B2 | 11/2004 | Perry |
| 7,127,087 | B2 | 10/2006 | Huang et al. |
| 7,224,820 | B2 | 5/2007 | Inomata et al. |
| 7,480,640 | B1 | 1/2009 | Elad et al. |
| 7,574,409 | B2 | 8/2009 | Patinkin |
| 7,647,331 | B2 | 1/2010 | Li et al. |
| 7,961,960 | B2 | 6/2011 | Bashyam et al. |
| 8,010,466 | B2 | 8/2011 | Patinkin |
| 8,055,078 | B2 | 11/2011 | Choi et al. |
| 8,055,667 | B2 | 11/2011 | Levy |
| 8,165,407 | B1 | 4/2012 | Khosla et al. |
| 8,185,459 | B2 | 5/2012 | Wall et al. |
| 8,589,398 | B2 | 11/2013 | Sundaresan et al. |

(Continued)

FOREIGN PATENT DOCUMENTS

WO    2006096162 A2    9/2006

OTHER PUBLICATIONS

Lin, Jie, et al. "Deephash: Getting regularization, depth and fine-tuning right."arXiv preprint arXiv:1501.04711 (2015).*

(Continued)

*Primary Examiner* — Siamak Harandi
*Assistant Examiner* — Mai Tran
(74) *Attorney, Agent, or Firm* — Toler Law Group, PC

(57) ABSTRACT

A method includes receiving, at a neural network, a subset of images of a plurality of images of a training image set. The method includes training the neural network by iteratively adjusting parameters of the neural network based on concurrent application of multiple loss functions to the subset of images. The multiple loss functions include a classification loss function and a hashing loss function. The classification loss function is associated with an image classification function that extracts image features from an image. The hashing loss function is associated with a hashing function that generates a hash code for the image.

20 Claims, 5 Drawing Sheets

(56) References Cited

U.S. PATENT DOCUMENTS

| | | | |
|---|---|---|---|
| 8,644,620 | B1 | 2/2014 | Lam |
| 8,873,838 | B2 | 10/2014 | Suleyman et al. |
| 8,965,145 | B2 | 2/2015 | Moraleda et al. |
| 2003/0147548 | A1 | 8/2003 | Ruhl et al. |
| 2004/0025025 | A1 | 2/2004 | Venkatesan et al. |
| 2005/0131660 | A1 | 6/2005 | Yadegar et al. |
| 2005/0232512 | A1 | 10/2005 | Luk et al. |
| 2008/0141117 | A1 | 6/2008 | King et al. |
| 2008/0147714 | A1* | 6/2008 | Breternitz ............ G06F 12/0864 |
| 2008/0212899 | A1* | 9/2008 | Gokturk ............ G06F 17/30259 382/305 |
| 2012/0159620 | A1 | 6/2012 | Seifert et al. |
| 2016/0042253 | A1* | 2/2016 | Sawhney ............ G06K 9/6255 382/190 |
| 2016/0092765 | A1* | 3/2016 | Chilimbi .............. G06N 3/0454 706/25 |

OTHER PUBLICATIONS

Andoni, A. et al., "Near-Optimal Hashing Algorithms for Approximate Nearest Neighbor in High Dimensions", Communications of the ACM, Jan. 2008, vol. 51, No. 1, pp. 117-122.

Andrews, N., "Weighted Hamming Distance: Image Webservices with Hashcode", International Journal of Research in Information Technology, vol. 1, Issue 7, Jul. 2014, pp. 191-197.

Kan, M., et al., "Semisupervised Hashing via Kernal Hyperplane Learning for Scalable Image Search", IEEE Transactions on Circuits and Systems for Video Technology, vol. 24, No. 4, Apr. 2014, pp. 704-713.

Krizhevsky, A. et al., "ImageNet Classification with Deep Convolutional Neural Networks", Advances in Neural Information Processing Systems 25 (NIPS2012), 2012, pp. 1-9.

Lin, J., et al., "DeepHash: Getting Regularization, Depth and Fine Tuning Right", http://arxiv.org/pdf/1501.04711, Cornell University Library, Jan. 20, 2015, 9 pages.

Torralba, A. et al., "Small Codes and Large Image Databases for Recognition", IEEE Conference on Computer Vision and Pattern Recognition, IEEE, 2008, pp. 1-8.

Xia, R. et al., "Supervised Hashing for Image Retrieval via Image Representation Learning", Proceedings of the Twenty-Eighth AAAI Conference on Artificial Intelligence, Association for the Advancement of Artificial Intelligence, 2014, pp. 2156-2162.

Zheng, L., et al., "Seeing the Big Picture: Deep Embedding with Contextual Evidences", Cornell University Library, http://arxiv.org/pdf/1406.0132.pdf, Jun. 2014, 10 pages.

\* cited by examiner

HASH CODES FOR IMAGES

FIELD OF THE DISCLOSURE

The present disclosure is generally related to hash codes for images.

BACKGROUND

Similarity-preserving data hashing techniques may be used for various computer vision tasks (e.g., image search, object recognition, local descriptor compression, etc.). For example, a similarity-preserving data hashing function may map visual features of an original image into a discrete space (e.g., a binary Hamming space) in order to generate a hash code of the original image. The original image may be several hundred kilobytes in size (e.g., a Joint Photographic Experts Group (JPEG) image format), and the hash code is a compact surrogate representation of the original image. The compactness of the hash codes (often in tens of bytes per image) may significantly reduce network bandwidth consumption associated with network-based image search. Further, the compact hash codes may reduce overhead of large-scale visual data storage and may expedite similarity-based search, among other possible benefits.

DETAILED DESCRIPTION

Figure 1:
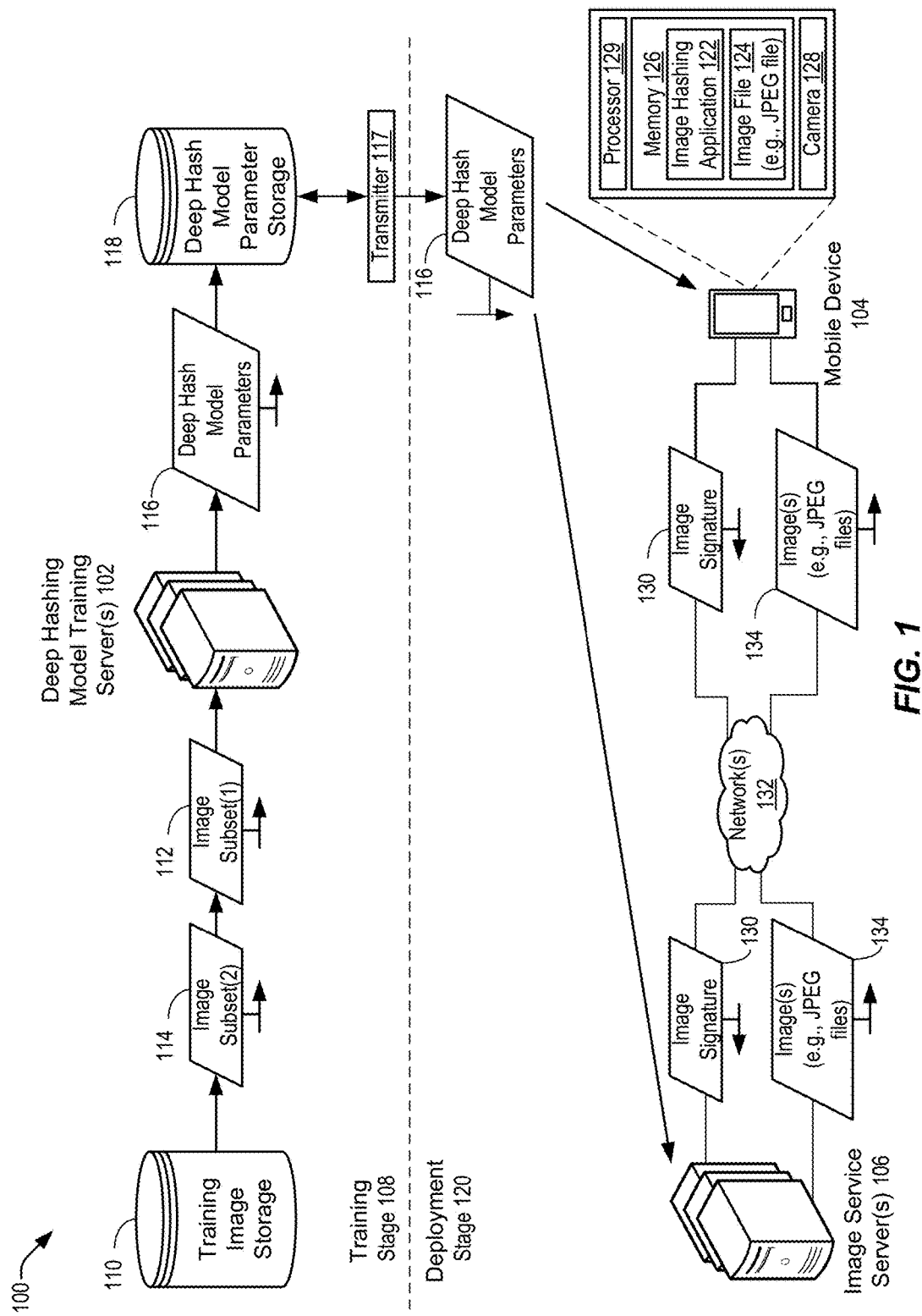
FIG. 1 is a diagram of a particular embodiment of a system for generating a deep hash model and deploying the deep hash model.

The present disclosure describes a "deep hashing" approach to image signature learning. A "deep neural network" is simultaneously trained for image feature extraction and hashing function learning. In an illustrative supervised hashing scheme, image feature extraction and hashing function learning are separated into two separate processes that are performed sequentially. To illustrate, in conventional supervised hashing schemes, a first process includes providing hand-crafted features extracted from data (e.g., bag-of-words features) to the neural network, and a second process of hashing function learning occurs after image feature extraction data is available to the neural network. By contrast, in the present disclosure, the processes of image feature extraction learning and hashing function learning are performed in parallel (e.g., concurrently or simultaneously) in the same neural network. In the present disclosure, neural network parameters are adjusted during a training stage such that a hash code that is output by a hashing function for a "raw" image (a "full-sized" image, such as a JPEG file) is an accurate signature/representation of the raw image (e.g., for image search purposes).

A similarity-preserving hashing technique (e.g., a locality-sensitive hashing (LSH) technique in the context of similarity-based search) may allow for compression of a large data set by sacrificing accuracy of data similarities. For large data sets (e.g., with millions of images), an LSH technique may allow for accelerated search using hash tables or Hamming-distance based ranking. LSH has been instantiated in several distance or similarity metrics (e.g., Hamming distance, cosine similarity, etc.). However, the pursuit of a particular metric which is consistent to image semantics is a challenging issue in computer vision.

To improve the accuracy of finding semantic neighbors in image search, various "supervised" hashing schemes have been developed. A supervised hashing technique may improve an accuracy of a hash code that is generated for an image, allowing for a more accurate similarity-based image search. For supervised hashing, side information is provided, such as by annotating labels of images or by specifying semantically similar/dissimilar data pairs. Such supervised hashing schemes separate procedures of image feature extraction and hash function learning into two separate computational components. For example, such supervised hashing schemes may provide a "bag-of-words" feature vector or sparse code as an input to a supervision-based hash function.

In the present disclosure, a large number of images of a training dataset are used as inputs to the neural network during the training stage. In the training stage, a classification loss function (e.g., a multi-class classification loss function) associated with an image classification function and a hashing loss function associated with a hashing function are applied to subsets of images of the training dataset in parallel for image feature extraction learning and hashing function learning, respectively. As described further herein with respect to FIG. 2, the hashing loss function may experience significant parameter instability (in some cases). As parameter instability may be associated with a hashing loss function, an auxiliary task (e.g., a multi-class image classification function) may be concurrently performed in the same neural network to improve parameter stability.

As raw images are used as inputs to the neural network during the training stage, inner layers of the neural network perform a task of extracting image features. In parallel, top layers of the neural network perform a task of generating binary hash codes. Parameters of the neural network are adjusted based on loss values from both the classification loss function and the hashing loss function, performing feature extraction learning and hashing function learning in parallel. Training the neural network is an iterative process, with the parameters of the neural network being updated multiple times based on the loss values determined by the two loss functions.

After the neural network parameters are adjusted during the training stage, a deep hash model is generated that includes a plurality of deep hash model parameters. The deep hash model parameters correspond to a first set of parameters (associated with the hashing function) adjusted during the training stage. The deep hash model parameters are provided to a mobile device for generating a hash code for an image (an "image signature") at the mobile device.

Further, the deep hash model parameters may be provided to an image service server (e.g., an image search server) for generating hash codes for a plurality of images (e.g., images of an image search database) for comparison to the image signature received from the mobile device. The mobile device may execute an image hashing application (that utilizes the deep hash model parameters) to generate a hash code for a raw image (e.g., a JPEG image). For example, a user at the mobile device may use a camera to capture the raw image, and the image hashing application at the mobile device may generate a hash code (also referred to herein as an "image signature") for the captured image. The image signature has a reduced number of bits compared to the raw image. As an illustrative example, the user may request to perform a network-based image search for other images that include similar features to the captured image. Rather than sending the raw image (e.g., a large JPEG file), the mobile device sends the image signature to an image service server via a network (e.g., a wireless communication network).

Based on the deep hash model parameters, hash codes (or an index of hash codes) may be generated at an image service server for images stored at an image service database (e.g., an image search database). The index may be used to identify a set of images to be provided to the mobile device based on the image signature received from the mobile device. After identifying the set of images that represent a "match" based on the image signature, one or more images (e.g., one or more JPEG images) may be sent from the image search server to the mobile device.

The deep hashing approach of the present disclosure may provide benefits to a network service provider, to other service providers that transmit/receive images (e.g., a social networking service, a search engine service, an image-sharing service), and to mobile device users. With respect to a network service provider, the proposed deep hashing method of the present disclosure is able to generate compact image signatures, such that for specific image-related tasks (e.g., image retrieval), the compact image signature is transmitted rather than the full-size image, resulting in reduced network traffic. With respect to other service providers that transmit/receive images, mobile device users may be more likely to utilize a service, resulting in increased revenue for the service provider. With respect to a mobile user with a budgeted data plan, transmitting compact image signatures instead of full-size image files may reduce data usage for individual image operations, allowing the mobile user to enjoy more services and/or reduce a cost of a data plan.

In a particular embodiment, a method includes receiving, at a neural network, a subset of images (also referred to as a "mini-batch" of images) of a plurality of images of a training image set. The method includes training the neural network by iteratively adjusting parameters of the neural network based on concurrent application of multiple loss functions to the subset of images. The multiple loss functions include a classification loss function and a hashing loss function. The classification loss function is associated with an image classification function that extracts image features from an image. The hashing loss function is associated with a hashing function that generates a hash code for the image.

In another particular embodiment, a system includes a processor and a memory coupled to the processor. The memory stores instructions that, when executed by the processor, cause the processor to perform various operations. The operations include concurrently performing (during a training stage) a first task and a second task in top layers of a neural network for each image of a plurality of images of a training image set. The first task includes adjusting a first set of parameters associated with a hashing function based on a first loss value generated by a hashing loss function for a particular image. The second task includes adjusting a second set of parameters associated with an image classification function based on a second loss value generated by a classification loss function for the particular image. In some cases, the first and second sets of parameters may have overlapping subsets of parameters. The operations further include generating (after the training stage) a deep hash model that includes a plurality of deep hash model parameters. The plurality of deep hash model parameters correspond to the adjusted first set of parameters associated with the hashing function (with the second set of parameters associated with the image classification function discarded after the training stage).

In another particular embodiment, a neural network is disclosed that includes convolution layers, pooling layers, inner product layers, and top layers. The convolution layers perform a first set of operations for each image of a plurality of images of a training image set, the pooling layers perform a second set of operations for each image, and the inner product layers perform a third set of operations for each image. The top layers concurrently perform a first task and a second task for each image. The first task includes adjusting a first set of parameters associated with a hashing function based on a first loss value generated by a hashing loss function for a particular image. The second task includes adjusting a second set of parameters associated with an image classification function based on a second loss value generated by a classification loss function for the particular image.

Referring to FIG. 1, a particular embodiment of a system of generating and deploying a deep hash model is illustrated and generally designated 100. As described further herein with respect to FIG. 2, a neural network may be trained during a training stage to generate a deep hash model. The deep hash model may include a plurality of deep hash model parameters that may be utilized by an image hashing application (e.g., at a mobile device) to generate a hash code (also referred to herein as an "image signature"). Further, the deep hash model parameters may be used to generate hash codes (or an index of hash codes) for use in various image service operations (e.g., image search).

In the particular embodiment illustrated in FIG. 1, the system 100 includes a deep hashing model training server 102 (or multiple model training servers), a mobile device 104, and an image service server 106 (or multiple image service servers). As further described herein with respect to FIG. 2, during a training stage 108, the deep hashing model training server(s) 102 are configured to train a neural network by iteratively adjusting parameters of the neural network based on concurrent application of multiple loss functions to training images. For example, FIG. 1 illustrates a training image storage database 110 that includes a plurality of images of a training image set. The multiple loss functions include a classification loss function associated with an image classification function that categorizes a particular image into pre-defined semantic classes and a hashing loss function associated with a hashing function that generates a hash code for the particular image.

As an example, FIG. 1 illustrates a first subset of images 112 (identified as "Image Subset(1)" in FIG. 1, also referred to as a first "mini-batch" of images) of the training image set. The deep hashing data model training server(s) 102 are configured to iteratively adjust parameters of the neural network based on concurrent application of the multiple loss functions to the first subset of images 112. The image classification function extracts image features from the first subset of images 112, and the classification loss function determines a first loss value for the first subset of images 112. The hashing function generates hash codes for the extracted image features from the first subset of images 112, and the hashing loss function determines a second loss value for the first subset of images 112 (as described further herein with respect to FIG. 2). The deep hashing model training server(s) 102 are configured to adjust parameters of the neural network based on the first and second loss values for the first subset of images 112. As further described herein with respect to FIG. 3, in some cases, a number of parameter adjustment iterations (e.g., for the first subset of images 112) may be determined based on a parameter adjustment iteration threshold (e.g., no more than 50,000 iterations for a single image or subset of images).

As another example, FIG. 1 illustrates a second subset of images 114 (identified as "Image Subset(2)" in FIG. 1, also referred to as a second "mini-batch" of images) of the training image set. The deep hashing data model training server(s) 102 are configured to iteratively adjust parameters of the neural network based on concurrent application of the multiple loss functions to the second subset of images 114. The image classification function extracts image features from the second subset of images 114, and the classification loss function determines a first loss value for the second subset of images 114. The hashing function generates hash codes for the extracted image features from the second subset of images 114, and the hashing loss function determines a second loss value for the second subset of images 114. The deep hashing model training server(s) 102 are configured to (further) adjust the parameters of the neural network based on the first and second loss values for the second subset of images 114. While FIG. 1 illustrates two subsets of images of a training image set (e.g., two "mini-batches" such as 300 images), it will be appreciated that this is for illustrative purposes only and that the iterative process of neural network parameter adjustment may be performed for multiple images (e.g., hundreds, thousands, or millions of images).

The deep hashing model training server(s) 102 are further configured to generate, based on the adjusted parameters of the neural network, a deep hash model that includes a plurality of deep hash model parameters 116. FIG. 1 illustrates that, upon completion of the training stage 108, the deep hash model parameters 116 associated with the deep hash model may be stored at a deep hash model parameter storage database 118.

FIG. 1 further illustrates that, after the training stage 108, the deep hash model parameters 116 may be deployed (e.g., using a transmitter 117) to the mobile device 104 during a deployment stage 120. The mobile device 104 is configured to execute an image hashing application 122 based on the deep hash model parameters 116 to generate a hash code (also referred to as an "image signature") for an image file stored at the mobile device 104. To illustrate, in FIG. 1, an image file 124 (e.g., a JPEG file having a particular number of bits) is stored at a memory 126 of the mobile device 104. In some cases, a camera 128 of the mobile device 104 may be configured to capture an image and to store information associated with the captured image in the memory 126 as the image file 124. FIG. 1 illustrates that the mobile device 104 may include a processor 129 configured to generate an image signature 130 for the image file 124 (based on the deep hash model parameters 116) and to send the image signature 130 via a network 132 (or multiple networks) to the image service server(s) 106 to perform an image service operation. As an example, the image service server(s) 106 may include image search server(s) that are configured to search an image database (not shown in FIG. 1) to return image(s) to the mobile device 104 via the network 132.

FIG. 1 further illustrates that, during the deployment stage 120, the deep hash model parameters 116 may be sent to the image service server(s) 106 for use in encoding the images in an image search database (not shown in FIG. 1), in order to allow for image-to-image comparisons based on corresponding hash codes (also referred to as "image signatures" herein). As an example, a hash code (e.g., the image signature 130 generated for the image file 124) received from mobile devices (e.g., the mobile device 104) via the network 132 may be compared to hash codes generated for the images in an image search database (not shown in FIG. 1). To illustrate, the image service server 106 is configured to send a set of images 134 (e.g., one or more JPEG image files) to the mobile device 134 responsive to receiving the image signature 130. The set of images 134 may be retrieved from an image search database (not shown in FIG. 1) based on the image signature received from mobile devices (e.g., the mobile device 104). In a particular embodiment, the image search database may include a plurality of hash codes or an index of hash codes generated based on the plurality of deep hash model parameters 116. The hash codes or the index of hash codes may be utilized to identify the set of images 134 after the image signature 130 is received and compared.

Figure 2:
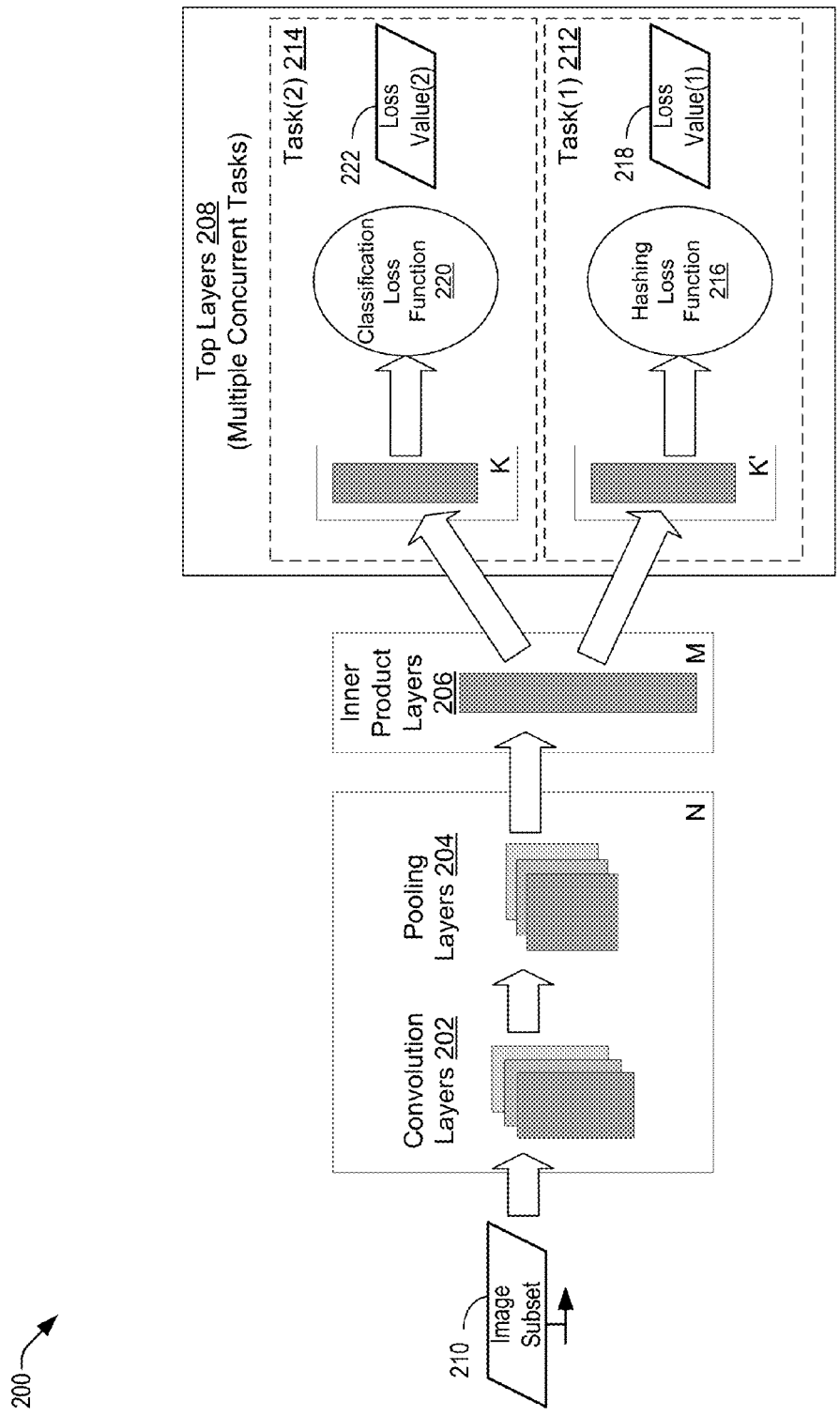
FIG. 2 is a diagram of a particular embodiment of a system of neural network parameter adjustment during a training stage via concurrent application of multiple loss functions to images of a training image set.

Referring to FIG. 2, a diagram of a particular embodiment of neural network parameter adjustment during a training stage of a neural network 200 via concurrent application of multiple loss functions to images of a training image set is illustrated. FIG. 2 illustrates that a first task and a second task may be concurrently performed at top layers of the neural network 200 during the training stage. For example, the first task may include adjusting a first set of parameters associated with a hashing function, and the second task may include adjusting a second set of parameters associated with an image classification function. In some cases, a subset of the first set of parameters may overlap with a subset of the second set of parameters. Rather than utilizing a bag-of-words feature vector or sparse code as an input, the supervised hashing approach of FIG. 2 concurrently determines the image features and the hashing functions in a unified framework.

In the particular embodiment illustrated in FIG. 2, the neural network 200 includes multiple convolution layers 202, pooling layers 204, inner product layers 206, and top layers 208. The various layers 202-208 of the neural network 200 are configured to perform various operations for multiple images, including an image subset 210 (also referred to as a "mini-batch" of images). While FIG. 2 illustrates a single image subset, it will be appreciated that this is for illustrative purposes only. The image subset 210 may represent one of a plurality subsets of images of a training image set (e.g., the images stored at the training image storage database 110 of FIG. 1), and various operations may be performed for each subset of images.

The convolution layers 202 are configured to perform a first set of operations for the image 210. The pooling layers 204 are configured to perform a second set of operations for the image 210. The inner product layers 206 are configured to perform a third set of operations for the image 210. During the training stage, the top layers 208 are configured to concurrently perform a first task 212 (identified as "Task (1)" in FIG. 2) and a second task 214 (identified as "Task(2)" in FIG. 2) for the image subset 210. The first task 212 includes adjusting a first set of parameters associated with a hashing function based on a first loss value 218 (identified as "Loss Value(1)" in FIG. 2) generated by a hashing loss function 216 for the image subset 210. The hashing function is configured to generate a hash code for the image 210 based on the first set of parameters. The second task 214 includes adjusting a second set of parameters associated with an image classification function based on a second loss value 222 generated by a classification loss function 220 for the image subset 210. The two tasks 212 and 214 share the set of parameters in the convolution layers 202, the pooling layers 204 and the inner product layers 206. In some cases, the hashing loss function 216 may experience significant parameter instability. In order to reduce parameter instability, FIG. 2 illustrates that multiple relevant tasks may be concurrently performed in the same (deep) neural network 200. In the particular embodiment illustrated in FIG. 2, a (multi-class) image classification loss layer is included in the (deep) neural network 200, forming an auxiliary task (the second task 214).

During the training stage, the neural network 200 illustrated in FIG. 2 is trained by iteratively adjusting network parameters based on concurrent application of the classification loss function 220 and the hashing loss function 216. As described further herein, a deep hash model including a plurality of deep hash model parameters (e.g., the deep hash model parameters 116 illustrated in FIG. 1) may be generated after the training stage. The deep hash model parameters may correspond to the adjusted first set of parameters associated with the hashing function. Part of the adjusted second set of parameters associated with the image classification function may be discarded (e.g., not included in the deep hash model) after the training stage, since many parameters in the top layers 208 are used for assisting the hashing function optimization during the training stage yet not directly related to generating hash codes code after the training stage. Parameters are partially discarded for the purpose of reducing the file size of the deep hash model. As illustrated and further described with respect to FIG. 1, the deep hash model parameters may be sent to a mobile device and to an image service server for use in generating an image signature for an image file and for comparing the image signature for an image service operation, respectively.

The following sections provide further details regarding the deep hashing algorithm, exponentiated margin maximization, and gradient calculation by function smoothing. Suppose a data set $\chi = \{x_1, \ldots, x_n\} \subset \mathbb{R}^d$ with supervision information is provided as the input. For each sample x, assume $\mathcal{S}(x)$ is the subset of its kind and $\mathcal{D}(x)$ collects the samples with highest dissimilarities. There are no constraints on the cardinalities of these two index sets such that they can support both sparse or dense annotations.

The neural network 200 used in deep hashing has such a structure such that the K neurons in the top layers 208 implicitly determine K mapping functions $h_i(\bullet): \mathbb{R}^{p \times q \times c} \mapsto \{-1,1\}$, $i=1 \ldots K$ that take multi-channel p×q-sized images as the inputs. Unlike a linear hashing function $h_i(x)$ implicitly encodes highly non-linearly. Let $f(\bullet)$ be the neural function up to the second topmost layer, and assume $$h(x;\theta) = \text{sign}(f(x;\theta)), \quad (1)$$

where $\theta = (\theta 1, \ldots, \theta^{nL})$ is the collection of network parameters for all $n_L$ layers in the deep network.

The hashing loss function 216 on the top layers 208 of the neural network 200 is defined on the binary hash codes, which reflects an expectation of "good" image binary signatures. The proposed hashing loss function 216 of the present disclosure includes an exponential discrete loss function which balances the use of supervision and is amenable to mini-batch based iterative update. Let $h(x) = (h_1(x), \ldots, h_K(x))^T \in \{-1,1\}^K$ denote K-bit hash vector for x (for brevity hereafter the parameter $\theta$ is ignored in Equation (1) whenever no confusion is raised), and $h_{\setminus k}(x) = (h_1(x), \ldots, h_{k-1}(x), h_{k+1}(x), \ldots, h_K(x))^T \in \{-1,1\}^{K-1}$ be the vector with the k-th bit absent. The "margin" between homogenous and heterogeneous samples for each x is defined according to Equation (2) below:

$$L(x) = \Sigma_{x_i \in \mathcal{D}_x} \frac{\|h(x) - h(x_i)\|}{2 \cdot K \cdot n^-(x)} - \Sigma_{x_i \in \mathcal{S}_x} \frac{\|h(x) - h(x_i)\|}{2 \cdot K \cdot n^+(x)} \quad (2)$$

Wherein $n^+(x)$, $n^-(x)$ denote the cardinalities of similarity/dissimilarity sets S(x), D(x) respectively. $\|h(x)-h(x')\|$ denotes the Hamming distance, namely the number of different bits between two hash vectors h(x), h(x'). The deep hashing approach of the present disclosure adjusts the parameters according to Equation (3) below:

$$\theta^* = \arg \min_\theta \Sigma_{x \in \chi} l(x) = \arg \min_\theta \Sigma_{x \in \chi} \exp(-L(x)) \quad (3)$$

The Hamming distance may be reduced to a hash code inner product through the relation $\|h(x)-h(x')\|/2 = K - h(x)^T h(x')$, in order to produce Equation (4) below:

$$L(x) = \Sigma_{x_i \in \mathcal{S}_x} \frac{\|h(x)^T h(x_i)\|}{K \cdot n^+(x)} - \Sigma_{x_i \in \mathcal{D}_x} \frac{\|h(x)^T h(x_i)\|}{K \cdot n^-(x)} \quad (4)$$

An advantage of the exponential loss function is its derivation to a stagewise regression problem. The following section depicts the idea in updating k-th bit when conditioned on the rest K−1 bits. Observing that L(x) in Equation (4) is separable, we have $L(x) = L(x) = \Sigma_{k=1}^K L_k(x)$ with $L_k(x)$ defined according to Equation (5) below:

$$L_k(x) = \Sigma_{x_i \in \mathcal{S}_x} \frac{h_k(x) h_k(x_i)}{K \cdot n^+(x)} - \Sigma_{x_i \in \mathcal{D}_x} \frac{h_k(x) h_k(x_i)}{K \cdot n^-(x)} \quad (5)$$

Let $L_{\setminus k}(x) = L(x) - L_k(x)$ be the margin obtained by ignoring the k-th bit. Based on Equation (3), the following equations are produced:

$$l(x) = \exp(-L_{\setminus k}(x) - L_k(x)) \quad (6)$$

$$\approx \exp(-L_{\setminus k}(x)) \cdot \left[1 - L_k(x) + \frac{1}{2} L_k^2(x)\right], \quad (7)$$

where the approximation in Equation (7) derives from Taylor expansion up to the second order. Let $\omega_k(x) \propto \exp(-L_{\setminus k}(x))$ be the weight of x in updating the k-th bit. It reflects whether the "margin" of x is already "good enough" given merely the rest K−1 bits. After proper normalization, it can form a valid probabilistic distribution over X. Updating the k-th bit reduces to minimizing the following equation:

$$\theta \leftarrow \arg\min_{\theta} \Sigma_x \omega_k(x) \cdot \left[1 - L_k(x) + \frac{1}{2} L_k^2(x)\right] \quad (8)$$

The hash bits are stacked for all X samples together to get a hash code matrix as presented in the equation below:

$$H = \begin{bmatrix} h_1(x_1), & h_1(x_2), & \cdots & h_1(x_n) \\ \vdots & \vdots & \ddots & \vdots \\ h_K(x_1), & h_K(x_2), & \cdots & h_K(x_n) \end{bmatrix} \in \{-1, 1\}^{K \times n} \quad (9)$$

Likewise, a weight matrix $W \in \mathbb{R}_+^{K \times n}$ may be defined with $W(k, i) = \omega(x_i)$, and neural activation response matrix with $F(k, i) = f_k(x_i)$, where $f_k(\bullet)$ is defined as in Equation (1) with index k.

Let $h_k$, $w_k$, $f_k$ be the k-th row of H, W, F respectively, which collect the hash bits (weights, or activations) under the k-th hashing functions.

The objective function in Equation (8) can be transformed into a quadratic form $h_k^T A_k h_k$ after ignoring some constant terms, where $A_k \in \mathbb{R}^{n \times n}$ is k-specific coefficient matrix. In the case that $x' \in \mathcal{S}(x)$ whenever they share identical labels or $x' \in \mathcal{D}(x)$ otherwise, the (i, j)-th element of $A_k$ can be calculated by a function of W and several other variables (e.g., K).

Due to the discreteness of hash bits, it may not be feasible to calculate the gradient of $h_k^T A_k h_k$. As such, in the present disclosure, the smooth parameterized upper bound may be adjusted instead. When updating the k-th bit, for any parameter $\alpha \geq 0$, there is $$h_k^T A_k h_k \leq \max_g \{g^T A_k + \alpha g^T(w_k \odot f_k)\} - \max_h \alpha h^T(w_k \odot f_k), \quad (10)$$

where g, $h \in \{-1, 1\}^n$ are both auxiliary vectors and $\odot$ denotes element-wise multiplication.

The soundness of the above smooth relaxation can be shown by noting $h_k = \arg\max_h h^T f_k$ (since $h_k = \text{sign}(f_k)$, where sign is the signum function, by definition) and properly instantiating g. Note that the equality in Equation (10) immediately holds by setting $g = h_k$, whatever non-negative value $\alpha$ takes. Optimizing over g, h provides space for further increasing the value of the right hand side, which proves the soundness of the inequality. To determine $g^*$ in Equation (10), the following observation is noted in Equation (11) below. As a proposition (local optimality condition), let $g^*$ be a solution of $\arg\max_g \{g^T A_k g + \alpha g^T(w_k \odot f_k)\}$ and $$v = (A_k + A_k^T)g^* + \alpha(w_k \odot f_k) \quad (11)$$

where $g^*$ is a local optimum when the condition $g^* \odot v \leq 0$ holds.

As a proof, recall that $g^*$ is a binary vector. Flipping any bit of $g^*$ will incur specific change of the objective function. When the changes incurred by all these flipping operations are all negative, $g^*$ is supposed to be locally optimal. The claim trivially holds by verifying that $g^* \odot v$ is the vector of changes after proper scaling.

The above proposition illustrates that selecting a subset of current g such that by flipping them the objective value increases. This inspires a greedy strategy for sequentially updating g. The procedure is presented in the following gradient descent by sequential bit flipping pseudo-code, where the core operation is shown in lines 6-8.

Line 1: Input: hash code matrix H, feature matrix F, data labels, parameter $\theta$ and step size $\eta > 0$;
Line 2: Output: updated network parameters $\theta$;
Line 3: for k=1 to K do
Line 4: Calculate coefficient matrix $A_k$;
Line 5: Initialize $g = h_k$ and calculate v according to Equation (11);
Line 6: For i=1 to n do
Line 7: if g(i) g(i)·v(i)>0, g(i)←−g(i);
Line 8: end for
Line 9: $g_k^* = g$;
Line 10: end for
Line 11:

$$\theta \leftarrow \theta - \eta \cdot \frac{\partial(W \odot F) \odot (H - G^*)}{\partial \theta},$$

where $G^* = [g_1^*, \ldots, g_K^*]$;

The example pseudo-code provided above illustrates that the bit flipping operation is performed for one pass, trading accuracy for better efficiency. The algorithm updates the network parameters lazily. As seen in the parameter updating rule in Line 11, a sample is involved in gradient calculation when its hash bit is to be flipped. An advantage of such a lazy update is to avoid overly optimizing specific parameters in the neural network. Over-optimization may result in numerical instability. An illustrative example is attempting to increase/decrease a nearly-saturated neuron despite the fact that the corresponding numerical sign has already been its target value in hashing function learning.

The parameter $\alpha$ is introduced to balance the strengths of two forces, namely maximizing exponentiated margin as in $g^T A_k g$ and keeping activation/hash-bit consistency as in $g^T(w_k \odot f_k)$. When $\alpha \to +\infty$, $g^*$ must be $h_k$. When $\alpha$ drops towards zero, the objective gradually approaches $g^T(w_k \odot f_k)$, which indicates more flexibility of $g^*$ to deviate from $h_k$.

Figure 3:
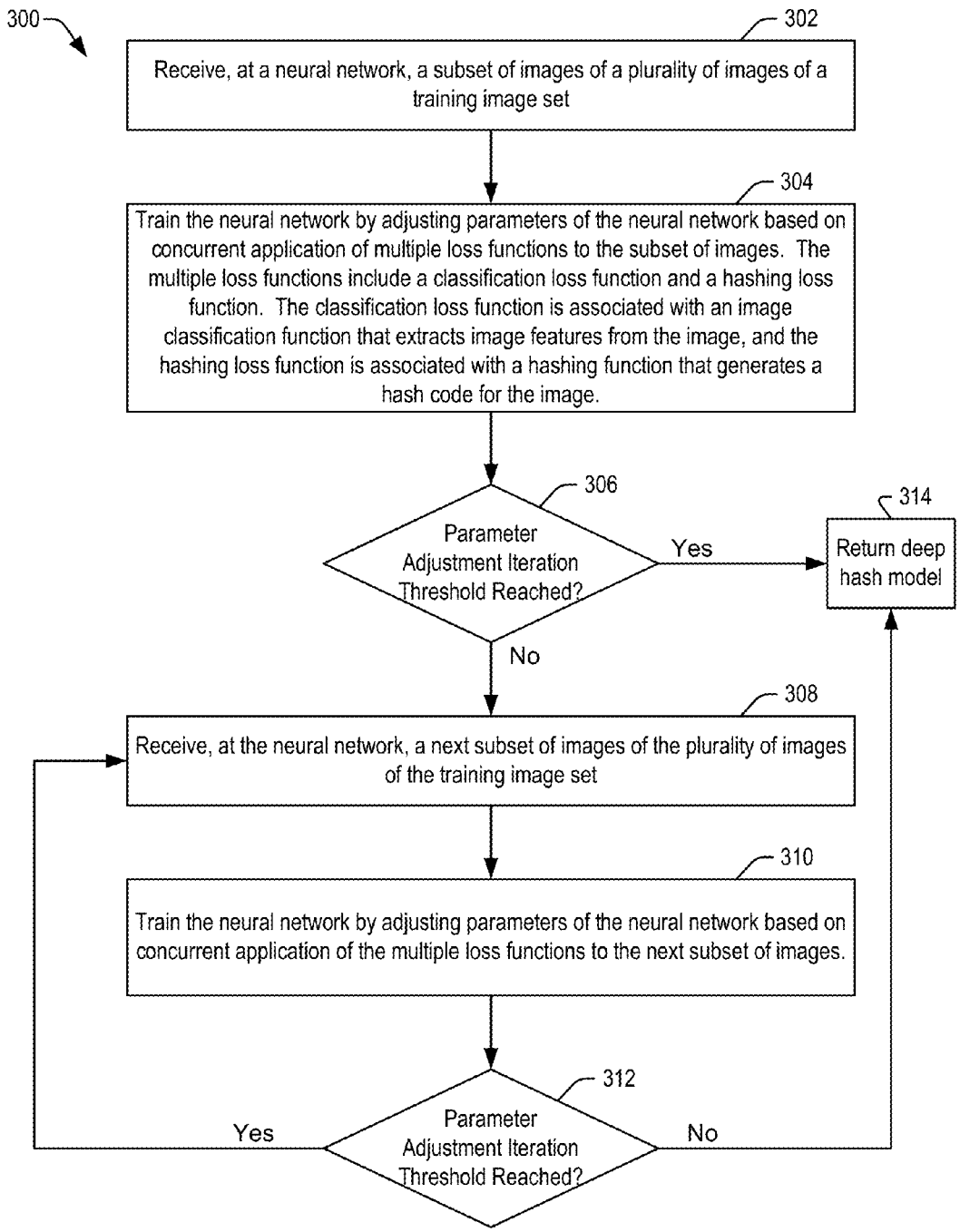
FIG. 3 is a flow diagram that illustrates a particular embodiment of a method for training a neural network by iteratively adjusting parameters of the neural network based on concurrent application of multiple loss functions to images of a training image set (e.g., a classification loss function associated with an image classification function and a hashing loss function associated with a hashing function)

FIG. 3 illustrates a particular embodiment of a method 300 for training a neural network by iteratively adjusting parameters of the neural network based on concurrent application of multiple loss functions to subsets of images of a training image set (e.g., a classification loss function associated with an image classification function and a hashing loss function associated with a hashing function).

The method 300 includes receiving, at a neural network, a subset (mini-batch) of images of a plurality of images of a training image set, at 302. For example, referring to FIG. 1, the deep hashing model server(s) 102 may receive the subset of images 112 (e.g., a collection of images with a predetermined number of images, such as 100 images) from the training image storage database 110 during the training stage 108. As another example, referring to FIG. 2, the image subset 210 may be received at the neural network 200 (e.g., at the convolution layers 202).

The method 300 includes training the neural network by (iteratively) adjusting parameters of the neural network based on concurrent application of multiple loss functions to the subset of images, at 304. The multiple loss functions include a classification loss function and a hashing loss function. The classification loss function is associated with an image classification function that extracts image features from the subset of images, and the hashing loss function is associated with a hashing function that generates hash codes for the subset of images. For example, referring to FIG. 2, the neural network 200 may be trained by adjusting the network parameters based on concurrent application of the classification loss function 220 and the hashing loss function 216. FIG. 2 illustrates that, for a particular iteration, the hashing loss function 216 may generate the first loss value 218 for the image subset 210, and the classification loss function 220 may generate the second loss value 222 for the image subset 210. The first loss value 218 and the second loss value 222 may be used to adjust the network parameters of the neural network 200.

In the particular embodiment illustrated in FIG. 3, the method 300 includes determining whether a number of parameter adjustment iterations for an individual image subset satisfies a parameter adjustment iteration threshold, at 306. As an illustrative, non-limiting example, the parameter adjustment iteration threshold may be set such that no more than 50,000 parameter adjustment iterations are performed for each subset of images of the training image set. When the parameter adjustment iteration threshold has not been reached for the image subset, the method 300 proceeds to 308. When the parameter adjustment iteration threshold has been reached, the method 300 may terminate by returning a deep hash model (as shown at 314). To illustrate, referring to FIG. 1, the parameter adjustment iteration threshold may determine a number of iterations for each of the first image subset 112 and the second image subset 114.

At 308, the method 300 includes receiving, at the neural network, a next subset of images of the plurality of images of the training image set. For example, referring to FIG. 1, the (next) image subset may correspond to the second image subset 114. The method 300 includes training the neural network by (iteratively) adjusting parameters of the neural network based on concurrent application of multiple loss functions to the (next) image, at 310. In the particular embodiment illustrated in FIG. 3, the method 300 includes determining whether a number of parameter adjustment iterations for the (next) image subset satisfies the parameter adjustment iteration threshold, at 312. When the parameter adjustment iteration threshold has not been reached for the (next) image, the method 300 proceeds to 308, where another image mini-batch is received at the neural network. When the parameter adjustment iteration threshold has been reached, the method 300 may terminate and return the final deep model (as shown at 314).

Thus, FIG. 3 illustrates that, during a training stage, the parameters of the neural network may be iteratively adjusted based on concurrent application of the multiple loss functions to multiple subsets of images of the plurality of images of the training image set. While not shown in the embodiment illustrated in FIG. 3, after the training stage, a deep hash model may be generated that includes a plurality of deep hash model parameters that correspond to an adjusted set of parameters associated with the hashing function.

Figure 4:
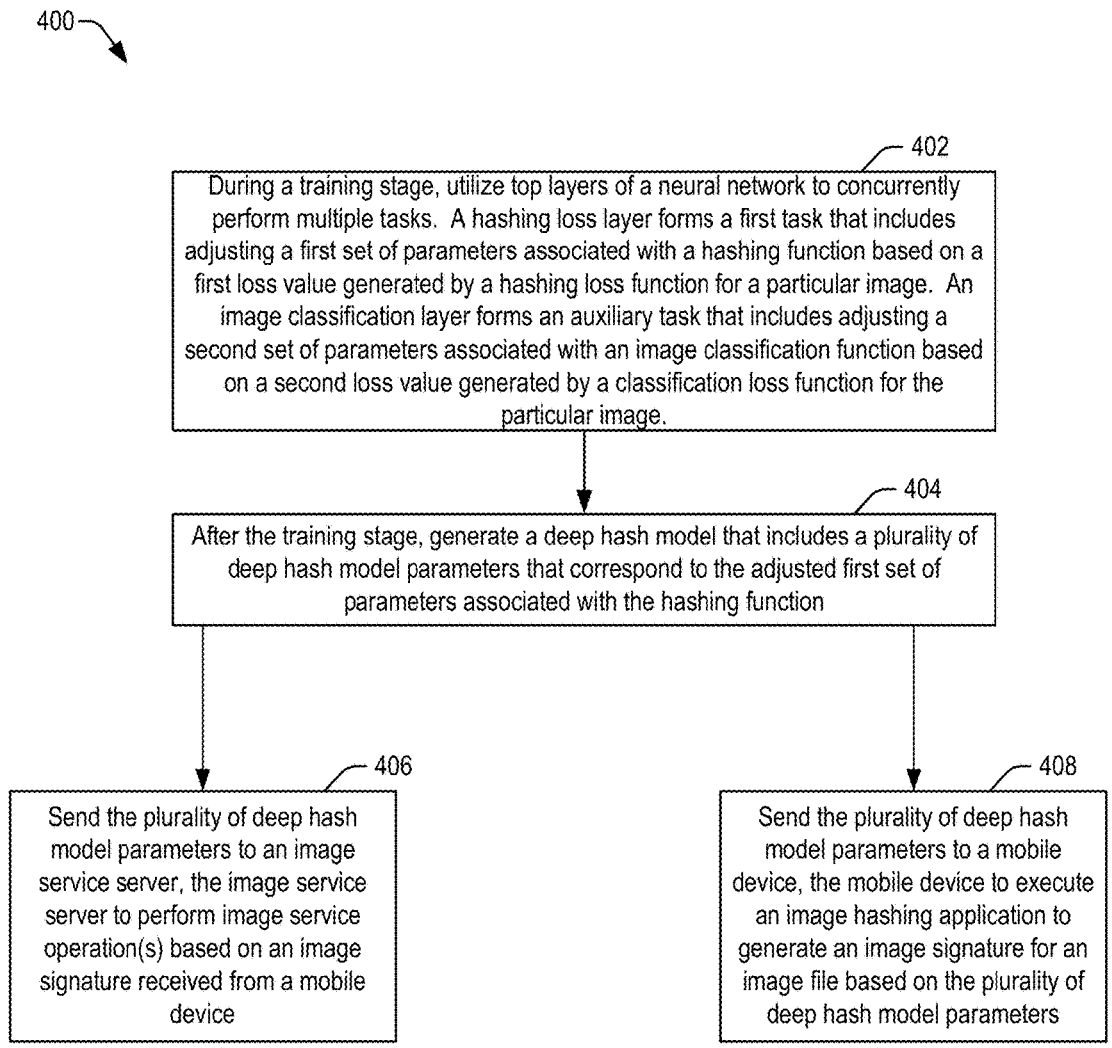
FIG. 4 is a flow diagram that illustrates a particular embodiment of a method for generating a deep hash model having a plurality of deep hash model parameters that correspond to an adjusted set of parameters associated with a hashing function (e.g., determined during a training stage of a neural network)

FIG. 4 illustrates a particular embodiment of a method 400 for generating a deep hash model having a plurality of deep hash model parameters that correspond to an adjusted set of parameters associated with a hashing function (e.g., determined during a training stage of a neural network).

The method 400 includes utilizing top layers of a neural network to concurrently perform multiple tasks, at 402. A hashing loss layer forms a first task that includes adjusting a first set of parameters associated with a hashing function based on a first loss value generated by a hashing loss function for a particular image (of a plurality of images of a training image set). An image classification layer forms an auxiliary task that includes adjusting a second set of parameters associated with an image classification function based on a second loss value generated by a classification loss function for the particular image. For example, referring to FIG. 2, the top layers 208 of the neural network are utilized to concurrently perform the first task 212 and the second task 214. In the example of FIG. 2, a hashing loss layer forms the first task 212 that includes adjusting a first set of parameters associated with a hashing function based on the first loss value 218 (generated for the image 210). Further, in the example of FIG. 2, an image classification layer forms an auxiliary task (the second task 214) that includes adjusting a second set of parameters associated with an image classification function based on the second loss value 222 (generated for the image 210).

The method 400 includes, after the training stage, generating a deep hash model that includes a plurality of deep hash model parameters, at 404. The plurality of deep hash model parameters correspond to the adjusted first set of parameters associated with the hashing function. For example, referring to FIG. 1, after the training stage 108, a deep hash model may be generated (for deployment during the deployment stage 120) with a plurality of deep hash model parameters 116 that correspond to the adjusted first set of parameters associated with the hashing function (as described further herein with respect to FIG. 2).

In the particular embodiment illustrated in FIG. 4, the method 400 further includes sending the plurality of deep hash model parameters to an image service server (e.g., an image search server), at 406. The image service server may make comparison operation on an image signature received from a mobile device (e.g., via a wireless communication network) based on the plurality of deep hash model parameters. For example, referring to FIG. 1, the deep hash model parameters 116 may be sent to the image service server(s) 106. The image service server(s) 106 may utilize the deep hash model parameters 116 for performing an image service operation (e.g., an image search operation).

FIG. 4 further illustrates that the method 400 may include sending the plurality of deep hash model parameters to a mobile device, at 408. The mobile device may execute an image hashing application to generate an image signature for an image file based on the plurality of deep hash model parameters. For example, referring to FIG. 1, the deep hash model parameters 116 may be sent to the mobile device 104. The mobile device 104 may execute the image hashing application 122 utilizing the deep hashing model parameters 116 to generate the image signature 130 for the image file 124 stored at the memory 126 of the mobile device 104.

Thus, FIG. 4 illustrates that, during a training stage, a neural network may be used to generate a set of deep hash model parameters for use in generating/comparing image signatures. As parameter instability may be associated with a hashing loss function, an auxiliary task (e.g., a multi-class image classification function) may be performed to improve parameter stability. After the training stage, a deep hash model may be generated, with a set of model parameters that corresponds to the adjusted set of parameters associated with the hashing function. The deep hash model parameters may be deployed to a mobile device (or multiple mobile devices) and to an image service server (or multiple image service servers) for use in various computer vision applications.

Figure 5:
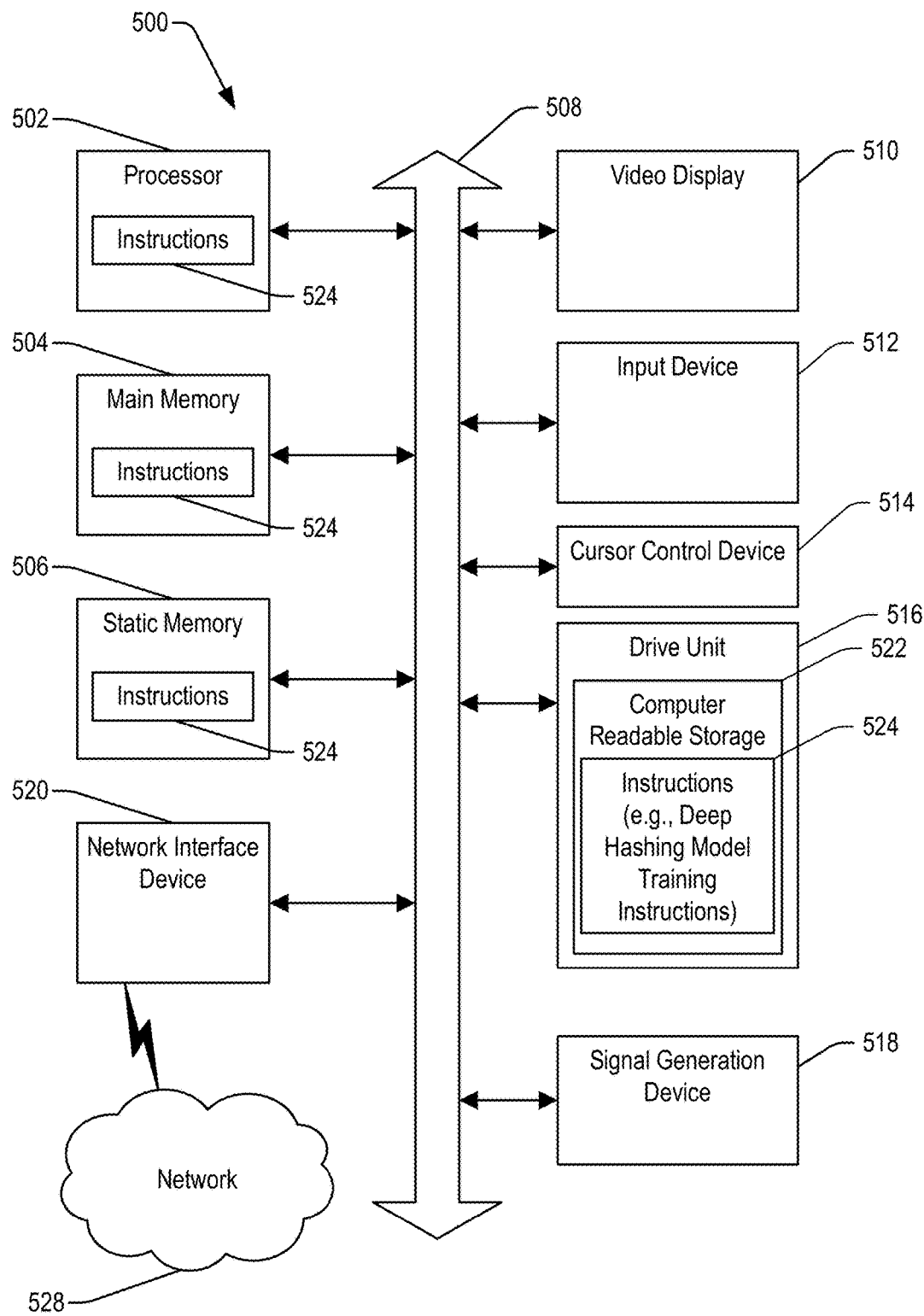
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the deep hashing model training server(s) 102, or combinations thereof described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, the processor 502 may include or correspond to a processor of the deep hashing model training server(s) 102 illustrated in FIG. 1. Moreover, the computer system 500 may include a main memory 504 and a static memory 506, which can communicate with each other via a bus 508. For example, the main memory 504 may include or correspond to a memory of the deep hashing model training server(s) 102 illustrated in FIG. 1. As shown, the computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some embodiments, the input device 512 and the cursor control device 514 may be integrated into a single device, such as a capacitive touch screen input device. The computer system 500 may also include a signal generation device 518, such as a speaker, and a network interface device 520. Some computer systems 500 may not include an input device (e.g., a server may not include an input device).

In a particular embodiment, as depicted in FIG. 5, the device 500 may include computer-readable storage 522 in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein. When the device 500 corresponds to a server, FIG. 5 illustrates that the instructions 524 may include deep hashing model training instructions and other instructions. The instructions 524 may be executable by the processor 502 to perform one or more functions or methods described herein, such as the methods 300 and 400 described with reference to FIGS. 3 and 4, respectively. In a particular embodiment, the instructions 524 may reside completely, or at least partially, within the main memory 504, the static memory 506, and/or within the processor 502 during execution by the computer system 500. The main memory 504 and the processor 502 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to a network 528 may communicate voice, video or data over the network 528. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein. For example, the computer-readable storage device 522 may store instructions for execution by a processor to cause a computer system to perform any one or more of the methods 300 or 400 described with reference to FIGS. 3 and 4, respectively.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a neural network, a subset of images of a plurality of images of a training image set;
    at the neural network, iteratively adjusting parameters of the neural network based on concurrent application of multiple loss functions to the subset of images, the multiple loss functions including a classification loss function and a hashing loss function, wherein the classification loss function is associated with an image classification function that extracts image features from an image, and wherein the hashing loss function is associated with a hashing function that generates a hash code associated with the image; and
    generating, at the neural network, a deep hash model based on the adjusted parameters of the neural network, the deep hash model including a deep hash model parameter.

2. The method of claim 1, wherein the deep hash model includes a plurality of deep hash model parameters, the method further comprising sending the plurality of deep hash model parameters to a mobile device, the mobile device to execute an image hashing application based on the plurality of deep hash model parameters to generate an image signature for an image file stored at the mobile device, wherein the image signature has a first number of bits that is less than a second number of bits associated with the image file.

3. The method of claim 1, wherein the neural network adjusts the parameters according to a lazy learning algorithm.

4. The method of claim 1, further comprising sending the deep hash model to an image service server, the image service server to utilize the deep hash model to perform an image service operation, wherein the image service server is configured to send a set of images to a mobile device, the set of images retrieved from an image search database based on a comparison of an image signature received from the mobile device to a plurality of image signatures generated at the image service server based on the deep hash model.

5. The method of claim 4, wherein the set of images includes a set of Joint Photographic Experts Group (JPEG) images.

6. The method of claim 4, wherein the image search database includes an index that is generated based on the deep hash model, and wherein the index is utilized to identify the set of images based on the image signature.

7. The method of claim 1, wherein, during a training stage, the parameters of the neural network are iteratively adjusted based on concurrent application of the multiple loss functions to each image of the plurality of images of the training image set.

8. The method of claim 7, wherein a number of parameter adjustment iterations for an individual image of the plurality of images is determined based on a parameter adjustment iteration threshold.

9. The method of claim 7, wherein, during the training stage, a first task and a second task are performed concurrently in top layers of the neural network, wherein the first task is associated with a hashing loss layer corresponding to the hashing function and the hashing loss function, and wherein the second task is associated with an image classification layer corresponding to the image classification function and the classification loss function.

10. The method of claim 9, wherein the first task includes adjusting a first set of parameters associated with the hashing function based on a first loss value generated by the hashing loss function, and wherein the second task includes adjusting a second set of parameters associated with the image classification function based on a second loss value generated by the classification loss function.

11. The method of claim 10, further comprising, after the training stage, generating the deep hash model that includes the first set of parameters associated with the hashing function.

12. The method of claim 10, wherein a subset of parameters of the second set of parameters associated with the image classification function are not utilized for generating hash codes during the training stage, and wherein the deep hash model does not include the subset of parameters.

13. The method of claim 10, wherein a particular parameter is included in both the first set of parameters and the second set of the parameters.

14. A system comprising:
a processor; and
a memory coupled to the processor, the memory storing instructions that, when executed by the processor, cause the processor to perform operations including:
during a training stage, concurrently perform a first task and a second task at a neural network for multiple subsets of images of a plurality of images of a training image set, wherein the first task includes adjusting a first set of parameters associated with a hashing function based on a first loss value generated by a hashing loss function for a particular image, and wherein the second task includes adjusting a second set of parameters associated with an image classification function based on a second loss value generated by a classification loss function associated with the particular image; and
after the training stage, generating a deep hash model that includes a deep hash model parameter, wherein the deep hash model parameter corresponds to a first parameter of the adjusted first set of parameters associated with the hashing function.

15. The system of claim 14, wherein the operations further comprise sending the deep hash model to a mobile device, the mobile device to execute an image hashing application based on the deep hash model to generate an image signature for an image file stored at the mobile device, wherein the image signature has a first number of bits that is less than a second number of bits associated with the image file.

16. The system of claim 14, wherein the deep hash model includes a plurality of deep hash model parameters, the plurality of deep hash model parameters including the first set of parameters and a particular parameter of the second set of parameters.

17. The system of claim 14, wherein the neural network comprises:
convolution layers;
pooling layers coupled to the convolution layers;
inner product layers coupled to the pooling layers; and
top layers coupled to the inner product layers, the top layers to concurrently perform the first task and the second task based on the multiple subsets of images.

18. A mobile device comprising:
a processor;
a memory coupled to the processor, the memory storing instructions that, when executed by the processor, cause the processor to perform operations including:
receiving a plurality of deep hash model parameters of a deep hash model; and
utilizing an image hashing application to generate, based on the plurality of deep hash model parameters, an image signature for an image file, the image signature having a first number of bits that is less than a second number of bits associated with the image file,
wherein the plurality of deep hash model parameters are obtained, at a neural network, by iteratively adjusting parameters of the neural network based on concurrent application of multiple loss functions to a subset of images of a plurality of images of a training image set, the multiple loss functions including a classification loss function and a hashing loss function, wherein the classification loss function is associated with an image classification function that extracts image features from an image, and wherein the hashing loss function is associated with a hashing function that generates a hash code associated with the image.

19. The mobile device of claim 18, wherein the operations further includes sending the image signature to an image search server via a wireless communication network to reduce network bandwidth consumption associated with image search operations.

20. The mobile device of claim 19, wherein the operations further include receiving a set of images from the image search server, wherein the set of images are retrieved from an image search database based on a comparison of the image signature to a plurality of image signatures generated at the image search server based on the plurality of deep hash model parameters.

* * * * *